(12) United States Patent
Mochizuki et al.

(10) Patent No.: US 7,848,053 B2
(45) Date of Patent: Dec. 7, 2010

(54) MAGNETIC HEAD AND MAGNETIC DISK STORAGE APPARATUS MOUNTING THE HEAD

(75) Inventors: Masafumi Mochizuki, Tokyo (JP); Kimitoshi Etoh, Tokyo (JP); Yoji Maruyama, Tokyo (JP); Hiroshi Fukui, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 966 days.

(21) Appl. No.: 11/707,804

(22) Filed: Feb. 15, 2007

(65) Prior Publication Data

US 2007/0188921 A1    Aug. 16, 2007

(30) Foreign Application Priority Data

Feb. 16, 2006  (JP) ............................. 2006-039772

(51) Int. Cl.
*G11B 5/147* (2006.01)

(52) U.S. Cl. ................................. 360/125.09

(58) Field of Classification Search ............ 360/125.09, 360/122, 125.08, 125.12, 125.06, 125.35, 360/125.07
See application file for complete search history.

(56) References Cited

U.S. PATENT DOCUMENTS

| | | | |
|---|---|---|---|
| 6,108,167 A | 8/2000 | Tateyama et al. | |
| 6,198,597 B1 | 3/2001 | Tateyama et al. | |
| 6,304,415 B1 | 10/2001 | Tateyama et al. | |
| 6,809,899 B1 * | 10/2004 | Chen et al. | 360/125.13 |
| 6,813,116 B2 | 11/2004 | Nakamura et al. | |
| 6,857,181 B2 | 2/2005 | Lo et al. | |
| 6,891,697 B2 | 5/2005 | Nakamura et al. | |
| 6,952,325 B2 * | 10/2005 | Sato et al. | 360/125.08 |
| 7,535,675 B2 * | 5/2009 | Kimura et al. | 360/125.09 |
| 7,710,685 B2 * | 5/2010 | Kimura et al. | 360/125.09 |
| 2002/0176214 A1 * | 11/2002 | Shukh et al. | 360/317 |
| 2003/0076627 A1 * | 4/2003 | Minor et al. | 360/125 |
| 2003/0076629 A1 * | 4/2003 | Minor | 360/126 |
| 2003/0151850 A1 | 8/2003 | Nakamura et al. | |
| 2004/0027729 A1 | 2/2004 | Lo et al. | |
| 2005/0057853 A1 | 3/2005 | Nakamura et al. | |
| 2005/0105215 A1 | 5/2005 | Matono | |
| 2006/0002018 A1 * | 1/2006 | Fukui et al. | 360/125 |
| 2006/0221497 A1 * | 10/2006 | Okada et al. | 360/125 |
| 2007/0195454 A1 * | 8/2007 | Kimura et al. | 360/126 |

FOREIGN PATENT DOCUMENTS

| | | |
|---|---|---|
| JP | 2003-242608 | 8/2003 |
| JP | 2005-93029 | 4/2005 |

* cited by examiner

*Primary Examiner*—Allen T Cao
(74) *Attorney, Agent, or Firm*—Zilka-Kotab, PC

(57) ABSTRACT

Embodiments in accordance with the present invention provide a magnetic head in which broadening of the effective track width can be decreased without reducing the write-field intensity and a variation of the track width can be decreased. A main pole consists of a pole tip having a part which provides the write track-width and a yoke part recessed from the air beating surface in the element height direction, and the pole tip consists of a pole tip at the trailing side where the width in the track-width direction is large and a pole tip at the leading side where the width in the track width direction is small. Moreover, the throat height of the pole tip at the trailing side is made greater than the throat height of the pole tip at the leading side.

16 Claims, 16 Drawing Sheets (prior art)

(prior art)

leading side ← → trailing side unit : ×1000/4π Oe (prior art)

Fig. 14
Fig. 14(a)
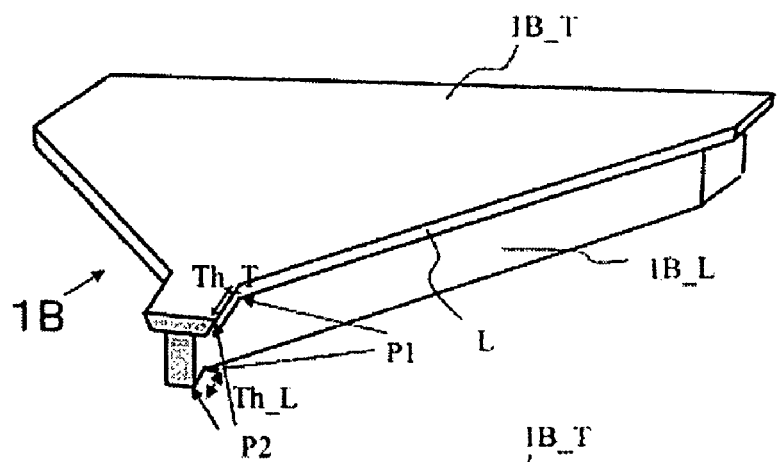
Fig. 14(b)
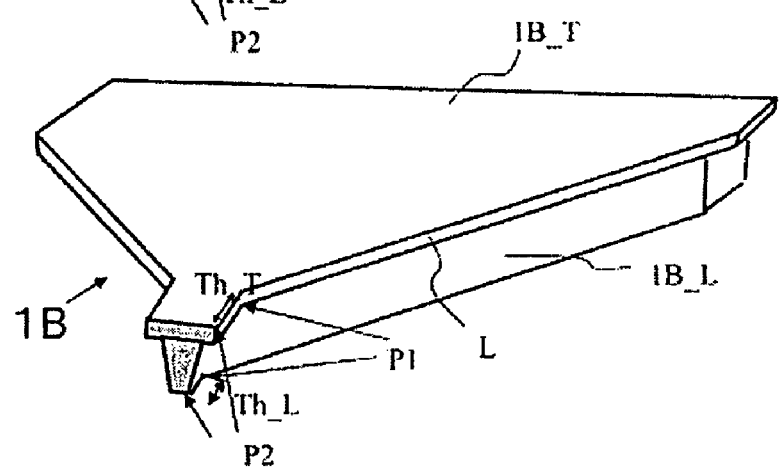
Fig. 14(c)
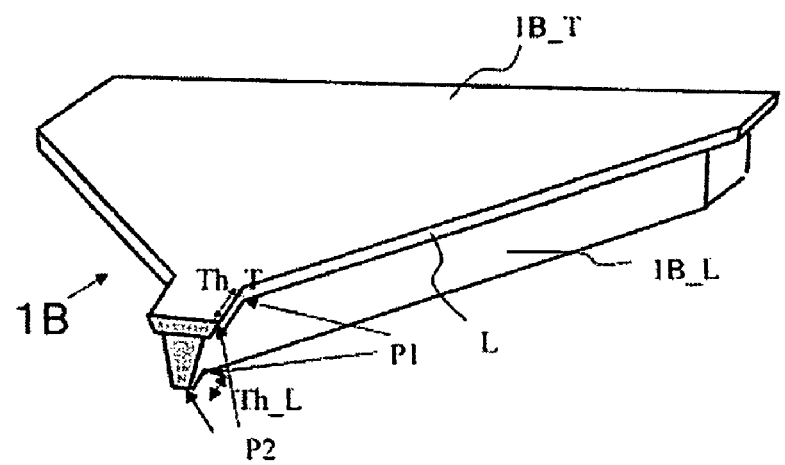

Fig. 17
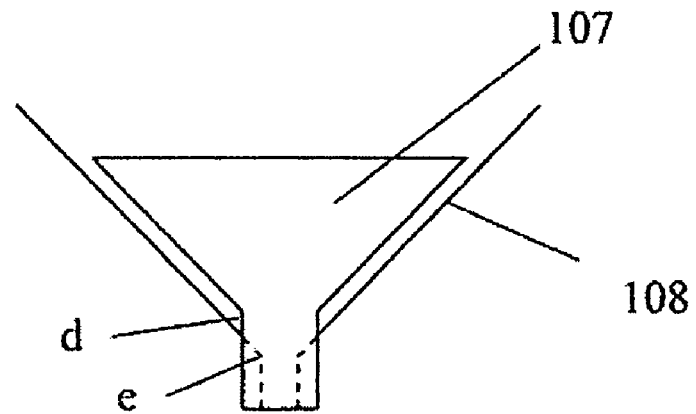
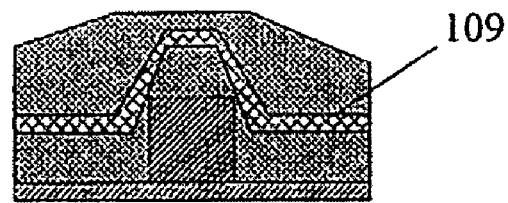
Fig. 18(a)
Fig. 18(b)

MAGNETIC HEAD AND MAGNETIC DISK STORAGE APPARATUS MOUNTING THE HEAD

CROSS-REFERENCE TO RELATED APPLICATION

The instant nonprovisional patent application claims priority to Japanese Application 2006-039772 filed Feb. 16, 2006 and incorporated by reference in its entirety herein for all purposes.

BACKGROUND OF THE INVENTION

Embodiments in accordance with the present invention relate to a magnetic head for perpendicular recording, a magnetic disk storage apparatus mounting the head, and a manufacturing method of a magnetic head.

A magnetic disk storage apparatus includes a recording medium and a magnetic head, and data on the recording medium are read/written by the magnetic head. It is desirable to reduce a recorded bit for improving the recording capacity per unit area of the magnetic recording medium However, in a current longitudinal recording method, there is the problem that the recording density cannot be increased because the issue of the thermal fluctuation of the magnetization of the medium arises when the recording bit length becomes smaller. A solution to this problem is a perpendicular recording method, in which the magnetization signal is recorded in the direction perpendicular to the medium. There are two kinds of perpendicular recording methods; one is a method using a double-layer perpendicular medium which includes a soft under layer as the recording medium and another is a method using a single-layer perpendicular medium which does not include a soft under layer. In the case when the double-layer perpendicular medium is used as the recording medium, a larger write-field can be applied thereto when writing is performed by using a so-called single-pole-type writer which includes a main pole and an auxiliary pole. Considering the case where the head has a skew angle, it is assumed that the shape of the air bearing surface of the main pole is a trapezoidal shape where the width at the leading side is narrower.

Moreover, the field gradient in the perpendicular element profile of the head field which writes the transition of the write bit cell, that is, the field gradient of the head field in the head downtrack direction is an important factor to achieve a high recording density in addition to the write head field intensity of. The field gradient has to be increased further to achieve a higher recording density in the future. A structure where a magnetic material is arranged at the trailing side of the main pole is known to improve the write-field gradient. Moreover, a structure where a magnetic material is arranged at the side of the main pole is also known.

Generally, a magnetic head is manufactured by stacking magnetic films, in order, on a substrate by using a sputtering technique or a plating technique. Therefore, a conventional structure is one where the face at the leading side of the main pole is parallel to the substrate and perpendicular to the head air bearing surface.

BRIEF SUMMARY OF THE INVENTION

According to embodiments of the present invention, a magnetic head is provided in which broadening of the effective track width can be decreased without reducing the write-field intensity and a variation of the track width can be decreased.

As shown in the particular embodiment of FIG. 4, a main pole includes a pole tip 1B having a part which provides the write track-width and a yoke part recessed from the air beating surface in the element height direction, and the pole tip consists of a pole tip 1B_T at the trailing side where the width in the track-width direction is large and a pole tip 1B_L at the leading side where the width in the track width direction is small. Moreover, the throat height Th_T of the pole tip 1B_T at the trailing side is made greater than the throat height Th_L of the pole tip 1B_L at the leading side.

BRIEF DESCRIPTION OF THE DRAWINGS

FIG. 14 is a schematic perspective drawing illustrating an example of a pole tip of a magnetic head in accordance with an embodiment of the present invention.

FIG. 17 is a drawing illustrating an example of a manufacturing method of a magnetic head in accordance with an embodiment of the present invention.

FIGS. 18(*a*)-(*b*) are drawings illustrating an example of a manufacturing method of a magnetic head in accordance with an embodiment of the present invention.

DETAILED DESCRIPTION OF THE INVENTION

Figure 1A:
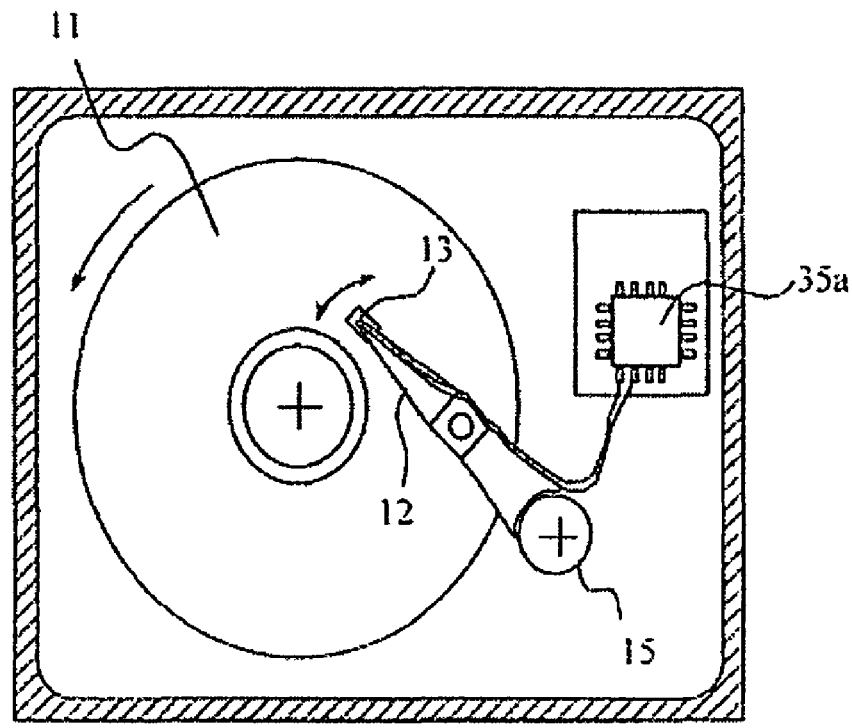
FIGS. 1(*a*)-(*b*) are conceptual drawings illustrating a magnetic storage disk apparatus.

Embodiments in accordance with the present invention relate to a perpendicular recording system which uses a perpendicular recording head having a main pole and an auxiliary pole and a double-layer perpendicular recording medium having a soft under layer. Even in a perpendicular recording, a magnetic film having a large coercivity is used for the recording layer in order to achieve a high recording density. Therefore, an increase in the write-field intensity applied to the recording layer and an increase in the write-field gradient at the trailing side are necessary. In addition, it is important to make narrower the write-field distribution in the track-width direction. The magnetization width which is written on the recording medium has to be made smaller by suppressing the write-field distribution in the track-width direction. Moreover, the decay and erasure of magnetization information which has already been recorded on the adjacent track has to be avoided by reducing the write-field intensity applied to a track which is adjacent to the track being written.

One of the techniques to increase the write-field intensity is to shorten the distance between the soft under layer and the write head. However, a certain degree of film thickness of the recording layer is necessary in order to improve the decay of magnetization caused by thermal fluctuation. Moreover, there are factors which prevent a reduction in the distance between the soft under layer and the head, such as smoothness of the recording layer surface, a lubricant, and the existence of a protection film for the head. Another approach is to increase the film thickness of the head main pole. Even in the same track-width, the write-field intensity can be made greater by increasing the film thickness of the head main pole and increasing the area of the air bearing surface of the main pole. However, in the case when the film thickness of the head main pole is increased, a large write-field is applied to the adjacent track when a write head has a skew angle.

In a magnetic disk apparatus, a suspension arm on which a head slider is fixed scans from the inside to the outside of the magnetic medium in order to perform read/write. Therefore, the head has a different angle against the write-track according to the position of the recording medium. This is the skew angle. The write-field of the double-layer perpendicular medium system has a distribution corresponding to the shape of the opposite surface of the head main pole. In the case when the film thickness of the head main pole is increased, the opposite surface of the air bearing surface of the head main pole approaches the adjacent track and a large write-field is applied to the adjacent track. As a result, decay and erasure of data on the adjacent track occur. Considering the case where the write head has a skew angle, there is a technology that the shape of the air bearing surface of the main pole is made to have a trapezoidal shape where the width of the leading side is narrower. However, when the shape of the air bearing surface of the main pole is made to have a trapezoid shape, the write-field intensity is also decreased because of the reduction in the area. In addition, a problem arises that the track width varies in the manufacturing process to make it a trapezoidal shape.

When magnetic materials are arranged at the trailing side and at the side of the main pole, although the write-field gradient at the trailing side increases and the distribution thereof in the track-width direction can be decreased, there is a disadvantage that the field intensity decreases.

As mentioned above, applying a large write-field intensity is necessary to increase the recording density without a decay and erasure of data on the adjacent track by making the write-track width on the medium smaller. This is a problem to be solved in order to achieve even higher recording density of a magnetic disk apparatus using a perpendicular recording.

It is an objective of the present invention to provide a magnetic head for perpendicular recording and a manufacturing method thereof on which a large write-field intensity is maintained, a narrow track can be achieved, and a large write-field intensity can be generated without decay and erasure of data on the adjacent track. Moreover, it is an objective of the present invention to provide a magnetic disk apparatus mounting the magnetic head for perpendicular recording.

A magnetic head in accordance with an embodiment of the present invention includes a main pole and an auxiliary pole, in which the main pole has a pole tip providing the write-track width and a yoke part recessed from the pole tip in the element-height direction; the pole tip consists of at least two magnetic films having different widths in the track-width direction; the width in the track-width direction at an air bearing surface of the magnetic film at the trailing side is greater than the width in the track-width direction at an air bearing surface of the magnetic film at the leading side; and a throat height of the magnetic film at the trailing side is greater than a throat height of the magnetic film at the leading side. Moreover, at the air bearing surface, the width of the magnetic film in the track-width direction at the trailing side of the pole tip is greater then the film thickness in the downtrack direction. At this time, at the air bearing surface, it is preferable that the width of the magnetic film in the track-width direction at the trailing side of the pole tip be greater than the film thickness in the downtrack direction. Furthermore, at the air bearing surface, it is preferable that the difference of the widths of the part where the magnetic film at the trailing side and the magnetic film of the leading side of the pole tip are connected to each other be greater than the film thickness in the downtrack direction of the magnetic film in the trailing direction.

The flare angle of the squeeze point of the pole tip may be different between the magnetic film at the trailing side and the magnetic film at the leading side. Moreover, the shapes of the air bearing surface of the magnetic film at either the trailing side or the leading side, or both sides of the pole tip may be made a reverse-trapezoid shape. Furthermore, the magnetic film of the pole tip at the leading side may be recessed from the air bearing surface.

According to a main pole structure in accordance with an embodiment of the present invention, a large write field can be generated even if the width of the write-field distribution in the head downtrack direction is small, and, even in the case when the head has a skew angle, data of the adjacent track is decayed and/or erased and the recording density can be increased. Herein, the head air bearing surface means the face opposite the magnetic film medium constituting the head excluding the overcoat composed of a non-magnetic material such as carbon.

According to embodiments of the present invention, broadening the write-field distribution in the track-width direction can be decreased without reducing the maximum write-field, and the write effective width can be made smaller. Moreover, a magnetic head, in which the distribution of the track width can be decreased and the distance between tracks be made more narrow, and a magnetic disk apparatus mounting this can be provided.

Hereafter, an embodiment of the present invention is described referring to the drawings. In the following drawings, the same reference codes are given to parts with a similar function.

Figure 1B:
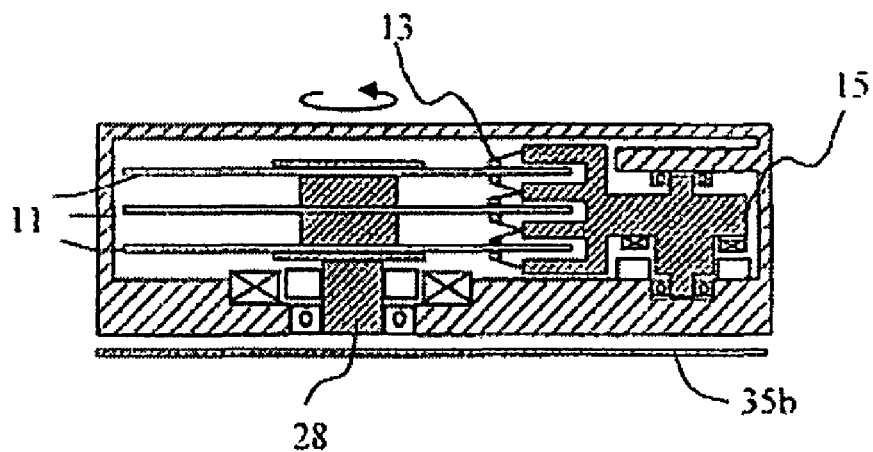

FIGS. 1(*a*)-(*b*) show conceptual drawings illustrating a magnetic disk storage apparatus. The magnetic disk storage apparatus performs read/write of a magnetic signal by using a magnetic head mounted on a slider 13 which is fixed at the tip of a suspension arm 12 at a predetermined position over a magnetic disk (recording medium) 11 which is rotated by a motor 28. The position of the magnetic head in the direction of the radius of the magnetic disk (track) can be selected by driving a rotary actuator 15. A write signal from the magnetic head and a read signal from the magnetic head can be processed by the signal processing circuits 35a and 35b.

Figure 2:
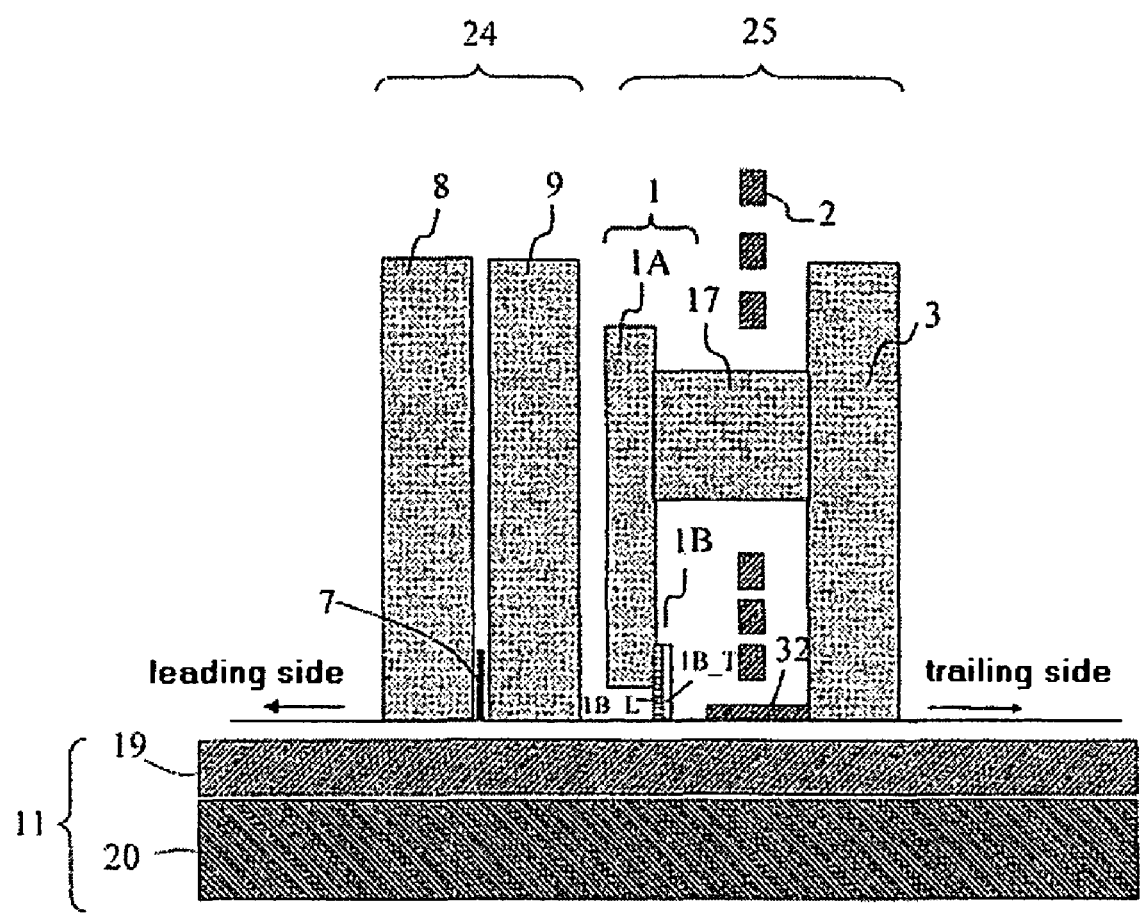
FIG. 2 is a cross-sectional schematic drawing illustrating an example of a magnetic head in accordance with an embodiment of the present invention at the track center.
Figure 3:
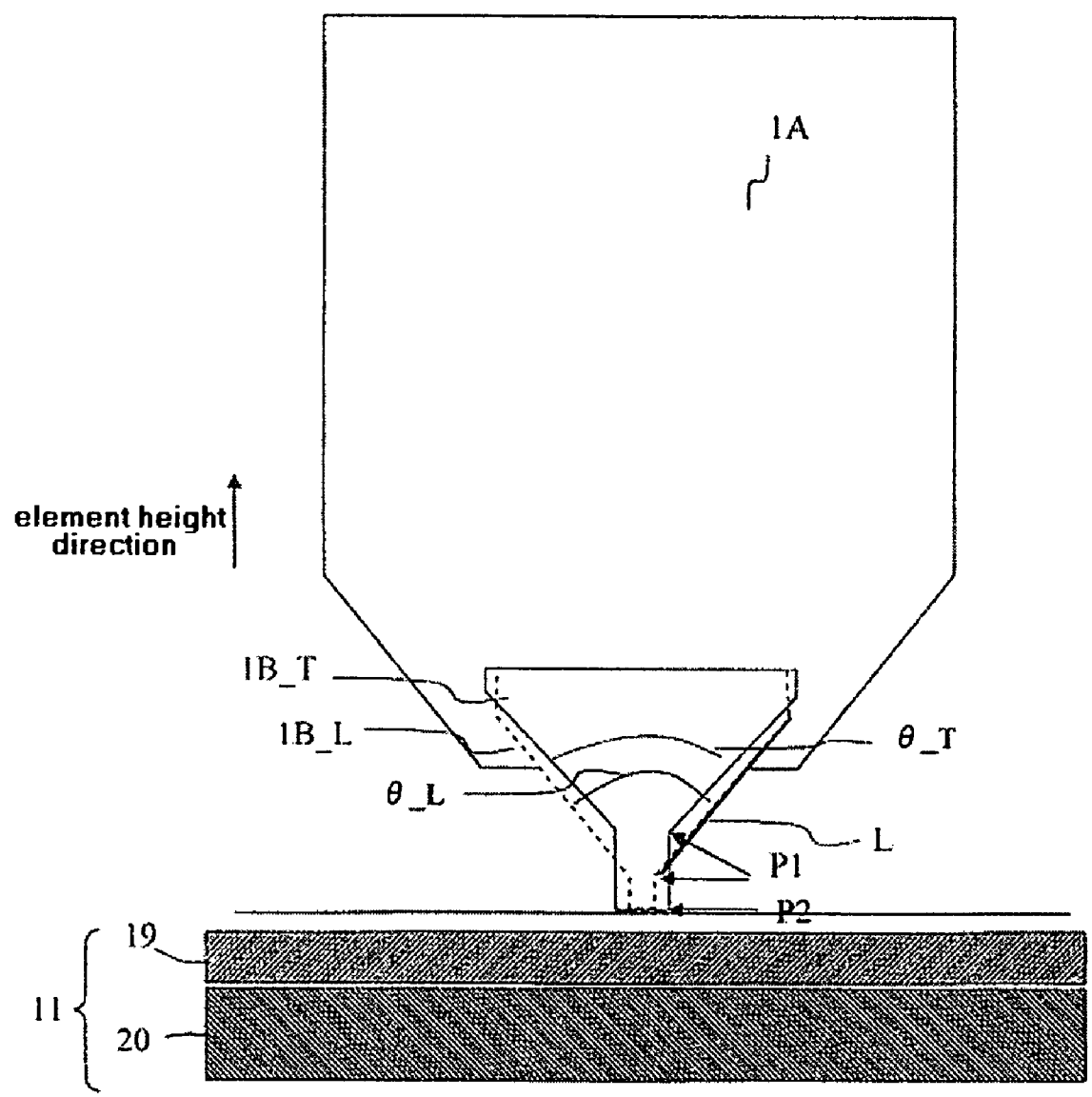
FIG. 3 is a plane schematic drawing illustrating an example of a magnetic head in accordance with an embodiment of the present invention as seen from the trailing direction.
Figure 4:
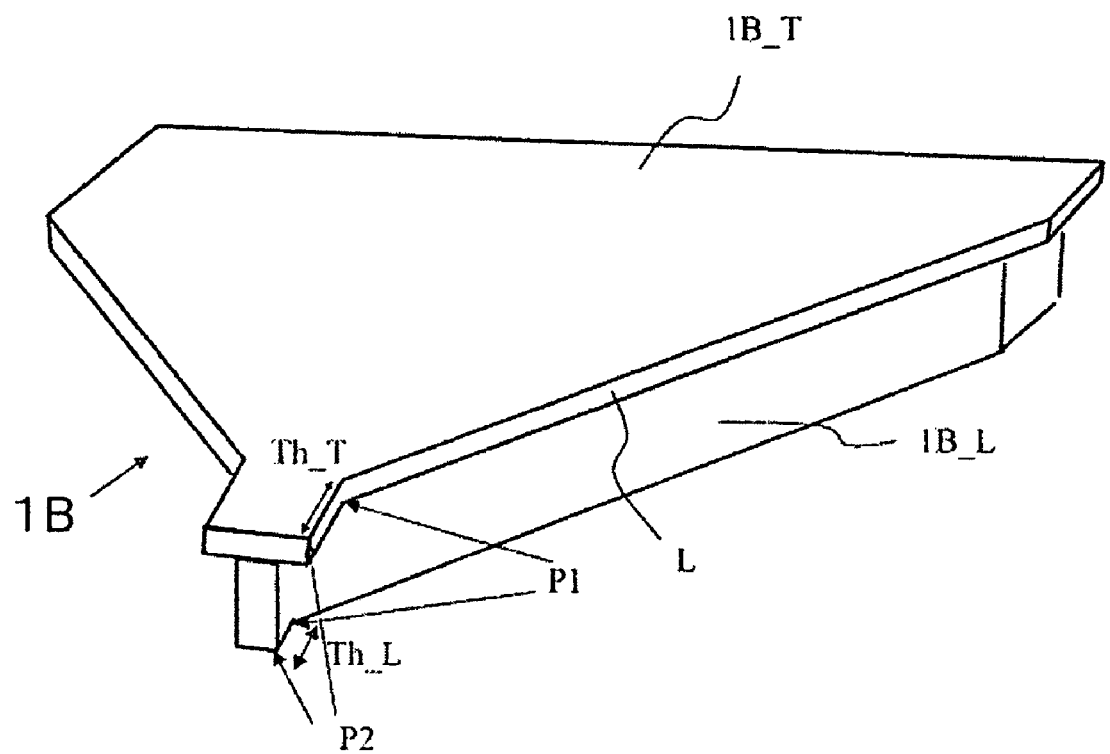
FIG. 4 is a schematic perspective drawing illustrating an example of a pole tip of a magnetic head in accordance with an embodiment of the present invention.

FIG. 2 is a cross-sectional schematic drawing illustrating an example of a magnetic head in accordance with an embodiment of the present invention at the track center. FIG. 3 is a plane schematic drawing illustrating a main pole as seen from the trailing direction. FIG. 4 is a schematic perspective drawing of the pole tip 1B illustrating an example of a main pole built into a magnetic head in accordance with an embodiment of the present invention. Schematic cross-sectional drawings illustrating the recording medium 11 are also shown in FIGS. 2 and 3.

This magnetic head is a read/write composite head having a write head (single-pole-head) 25 which includes a main pole 1 and an auxiliary pole 3 and a read head 24 having a read element 7. The read element 7 includes a giant magnetoresistive element (GMR) and a tunneling magnetoresistive element (TMR), etc. arranged at the gap of a pair of magnetic shields (read shield) consisting of a lower shield 8 at the leading side and a upper shield 9 at the trailing side. The main pole 1 and the auxiliary pole 3 are magnetically connected by a pillar 17 at a position left of the air bearing surface and a thin film coil 2 is interlinked with a magnetic circuit consisting of the main pole 1, an auxiliary pole 3, and a pillar 17. The main pole 1 is arranged at the leading side of the auxiliary pole 3. The main pole 1 consists of a main pole yoke part 1A which is connected to the auxiliary pole 3 by the pillar 17 and a pole tip 1B which is exposed to the head air bearing surface and provides the track-width.

The pole tip 1B includes at least two parts which have different widths in the track-width direction at the air bearing surface, and the throat height Th_T of the pole tip 1B_T at the trailing side is made to be greater than the throat height Th_L of the pole tip 1B_L at the leading side (refer to FIG. 4). Herein, in the pole tip 1B, the throat height is the length from the opposite face to the position (squeeze point) where the rate of change of the magnetic pole width in the track-width direction changes along the element height direction from the opposing medium surface in order to focus the magnetic flux to the tip part which provides the track width opposite the medium 11. Moreover, the width in the track direction of the pole tip 1B_T at the trailing side is greater than that of the pole tip 1B_L at the leading side at the air bearing surface.

Figure 5:
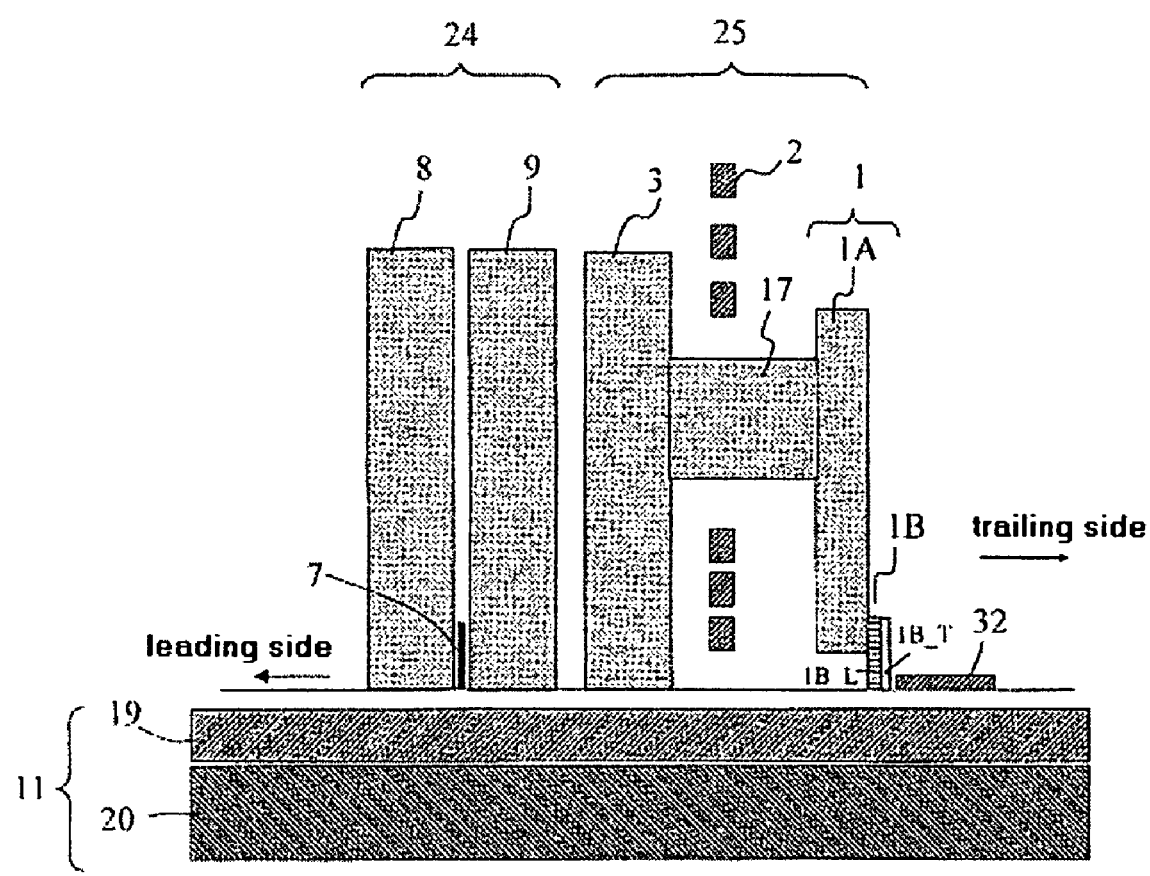
FIG. 5 is a cross-sectional schematic drawing at the track center illustrating another example of a magnetic head in accordance with an embodiment of the present invention.

The magnetic material 32 arranged at the trailing side of the main pole 1 is for increasing the write-field gradient of the perpendicular element profile of the head field in the head downtrack direction. In the head structure shown in FIG. 2, although the auxiliary pole 3 is arranged at the leading side, the auxiliary pole 3 may be arranged at the leading side of the main pole 1 as shown in FIG. 5. The write-field coming from the main pole 1 of the write head 25 forms a magnetic circuit which goes into the auxiliary pole 3 through the recording layer 19 and the soft under layer 20 of the recording medium 11 and a magnetization pattern is written on the recording layer 19. An intermediate layer may be formed between the recording layer 19 and the soft under layer 20.

Figure 6:
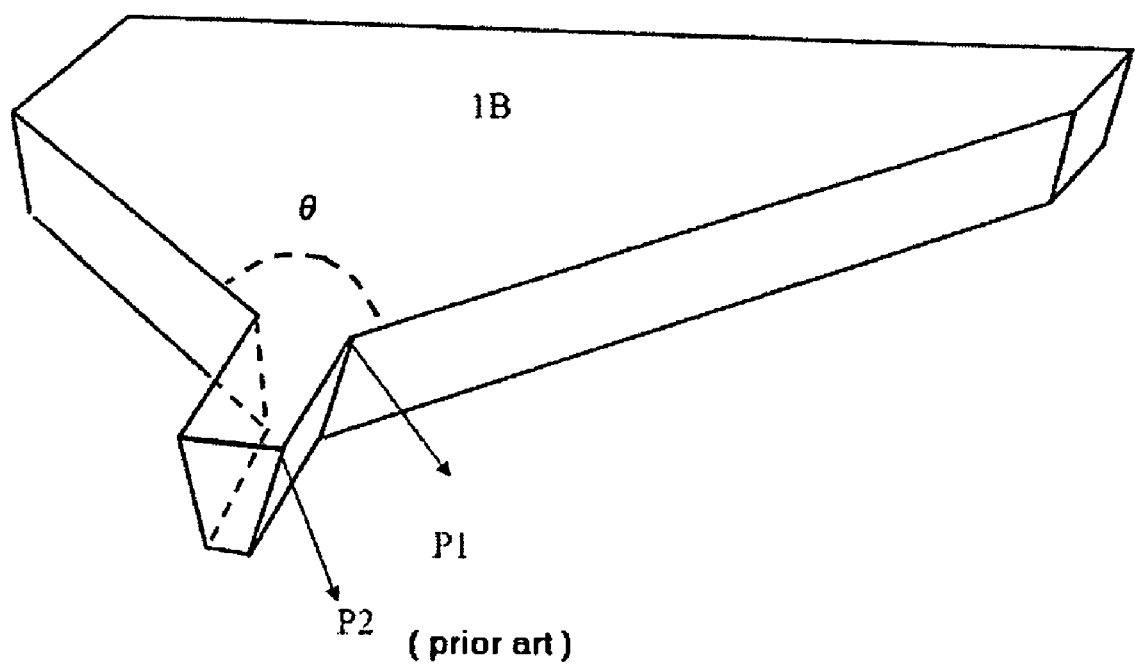
FIG. 6 is a schematic perspective drawing illustrating a pole tip of a conventional magnetic head structure.

The write field generated from the main pole to the magnetic head of an embodiment of the present invention and a conventional magnetic head was calculated by using a three-dimensional field calculation. As shown in FIG. 4, the main pole of the magnetic head of the embodiment of the present invention has a pole tip 1B that consists of at least two magnetic film layers having different widths in the track-width direction at the air bearing surface, and the throat height of the pole tip 1B_T at the trailing side becomes greater than the throat height of the pole tip 1B_L at the leading side. The pole tip 1B which is included in a main pole of the conventional design used for the calculation has a reverse-trapezoid structure where the width in the track direction continuously decreases from the trailing side to the leading side, as shown in FIG. 6.

The calculation conditions are as follows. The tip part of the magnetic film constituting the pole tip 1B_T at the trailing side of the magnetic head of the present invention shown in FIG. 4 is set to be a rectangle with a width of 100 nm and a thickness of 30 nm. The tip part of the magnetic film constituting the pole tip 1B_L at the trailing side is set to be a rectangle with a width of 40 nm and a thickness of 170 nm. (The figure shows only half the part of the track center.) Moreover, the throat height Th_T of the pole tip 1B_T at the trailing side is set to be 100 nm and the throat height Th_L of the pole tip 1B_L at the leading side is set to be 50 nm. In FIG. 4, P1 is called a squeeze point which is the intersection of the slope L of the pole tip 1B and the perpendicular along the element height direction from the edge of the air bearing surface P2 of the pole tip 1B, and the throat height is the distance from the squeeze point P1 to the edge of the air bearing surface P2. Moreover, in the schematic structural drawing of the main pole as seen from the trailing side shown in FIG. 3, the flares of the widths of the pole tips 1B_L and 1B_T from the squeeze point P1 of the border part of the pole tip 1B, which are flare angles θ_L and θ_T, are both assumed to be 90 degrees.

CoNiFe is assumed as a material of the pole tips 1B_T and 1B_L and the saturation magnetic flux density and the relative permeability are set to be 2.4 T and 500, respectively. 80 at % Ni-20 at % Fe having a saturation magnetic flux density of 1.0 T is assumed as the yoke part 1A of the main pole. A material having a saturation magnetic flux density of 1.0 T is assumed as the auxiliary pole 3, and the size is set such that the width in the track width direction is 30 μm, the length in the element height direction 16 μm, and the film thickness 2 μm. 80 at % Ni-20 at % Fe having a saturation magnetic flux density of 1.0 T is assumed as the upper shield 9 and the lower shield 8, and the size is set such that the width in the track width direction is 32 μm, the length in the element height direction 16 μm, and the film thickness 1.5 μm. The magnetic material 32 is not considered in this calculation.

CoTaZr is assumed as a material of the soft under layer 20 of the recording medium 11, and the distance from the surface of the soft under layer 20 from the head air bearing surface and the film thickness of the soft under layer are set to be 40 nm and 150 nm, respectively. The write field was calculated at the position where the center position of the recording layer is assumed to be 25 nm away from the head air bearing surface. Only a film thickness of 20 nm was considered for the medium recording layer 19.

For a magnetic head of the prior art having a main pole which is symmetrical to the track center shown in FIG. 6, calculations were carried out with the same conditions as the magnetic head of the aforementioned embodiment, including both shape and material, except for the shape of the pole tip 1B of the main pole. The tip part of the pole tip 1B is set to be 100 nm in width and 200 nm in film thickness. The shape of the air bearing surface is made to be a reverse-trapezoid shape where the width of the leading side is smaller. The width of the pole tip part at the leading side is set to be 40 nm. The throat height is set to be 80 nm.

Figure 7:
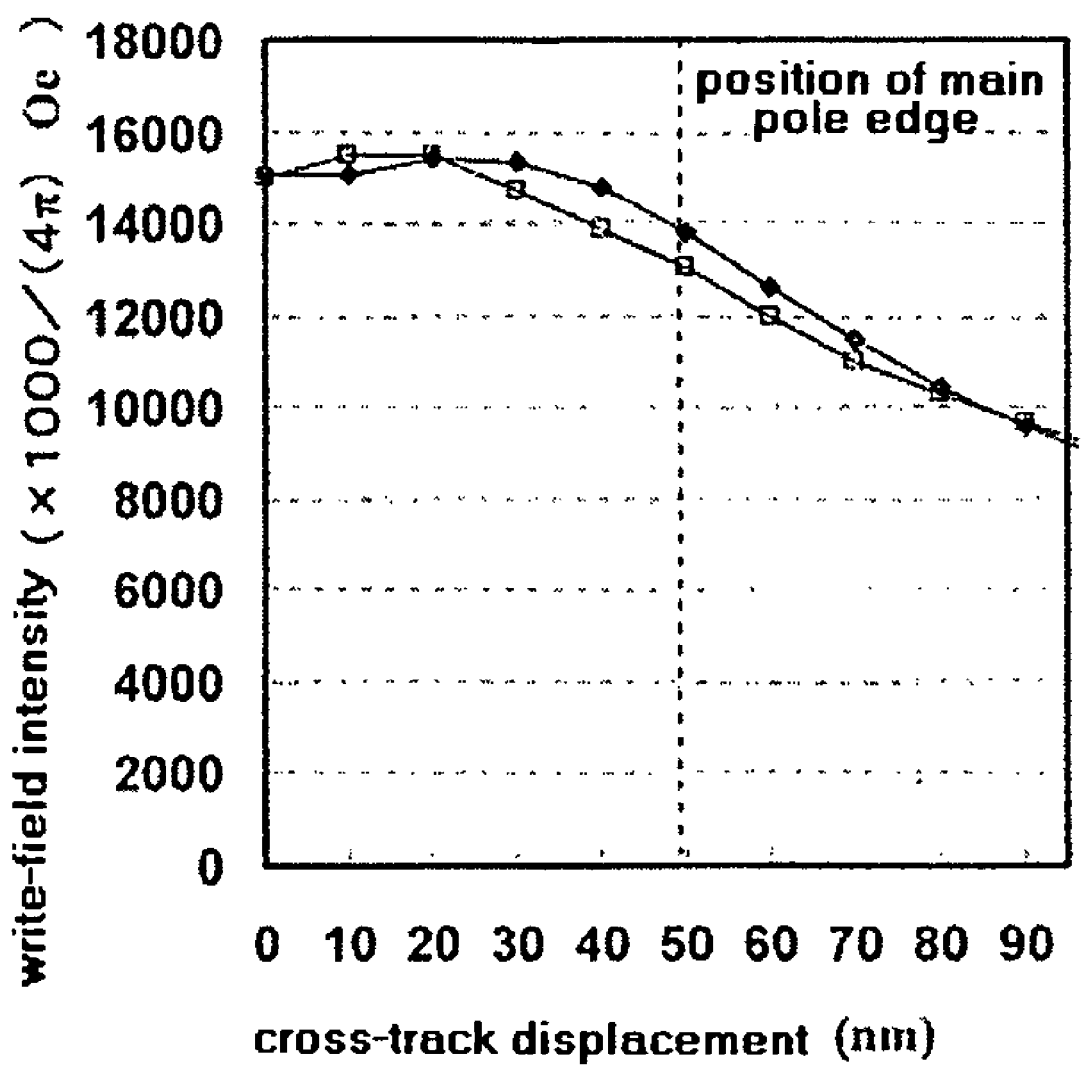
FIG. 7 is a comparison of the write-field distribution in the track-width direction between a magnetic head of the present invention and a conventional magnetic head.

FIG. 7 shows the results of a calculation. FIG. 7 is a graph illustrating a comparison of the write-field distribution in the track-width direction of a magnetic head of an embodiment of the present invention and a conventional magnetic head. The horizontal axis is the position in the track width direction and the vertical axis is the write-field intensity. The origin of the horizontal axis is the track center position of the main pole. In the case of the aforementioned conditions, according to the magnetic head of the present invention, broadening the write-field in the track-width direction can be made smaller without decreasing the write field intensity and the write effective width can be made smaller, resulting in a high recording density being achieved. Compared to a conventional magnetic head, the magnetic head in accordance with an embodiment of the present invention attempts to reduce the magnetic field width by 15 nm in vicinity of the edge of the magnetic pole and by 10 nm at the outside thereof. Therefore, there is an attempt to reduce the write-field width from 20 nm to 30 nm on both sides of the track.

In addition, since the magnetic head according to an embodiment of the present invention has a large throat height at the trailing side, there is an advantage in manufacturing. If the throat height is small, the dimension of the main pole in the track width direction varies. On the other hand, if a straight line part of the throat height is large, the variation can be decreased. When the throat height becomes large, the write-field intensity is decreased. However, in embodiment of the present invention, the throat height at the leading side is made small in order to increase the write-field intensity. The throat height at the leading side is preferably 500 nm or less in order to obtain large write-field intensity. Moreover, the difference of the throat height at the trailing side and the throat height at the leading side is preferably 50 nm or more concerning the variations in manufacturing.

Figure 8:
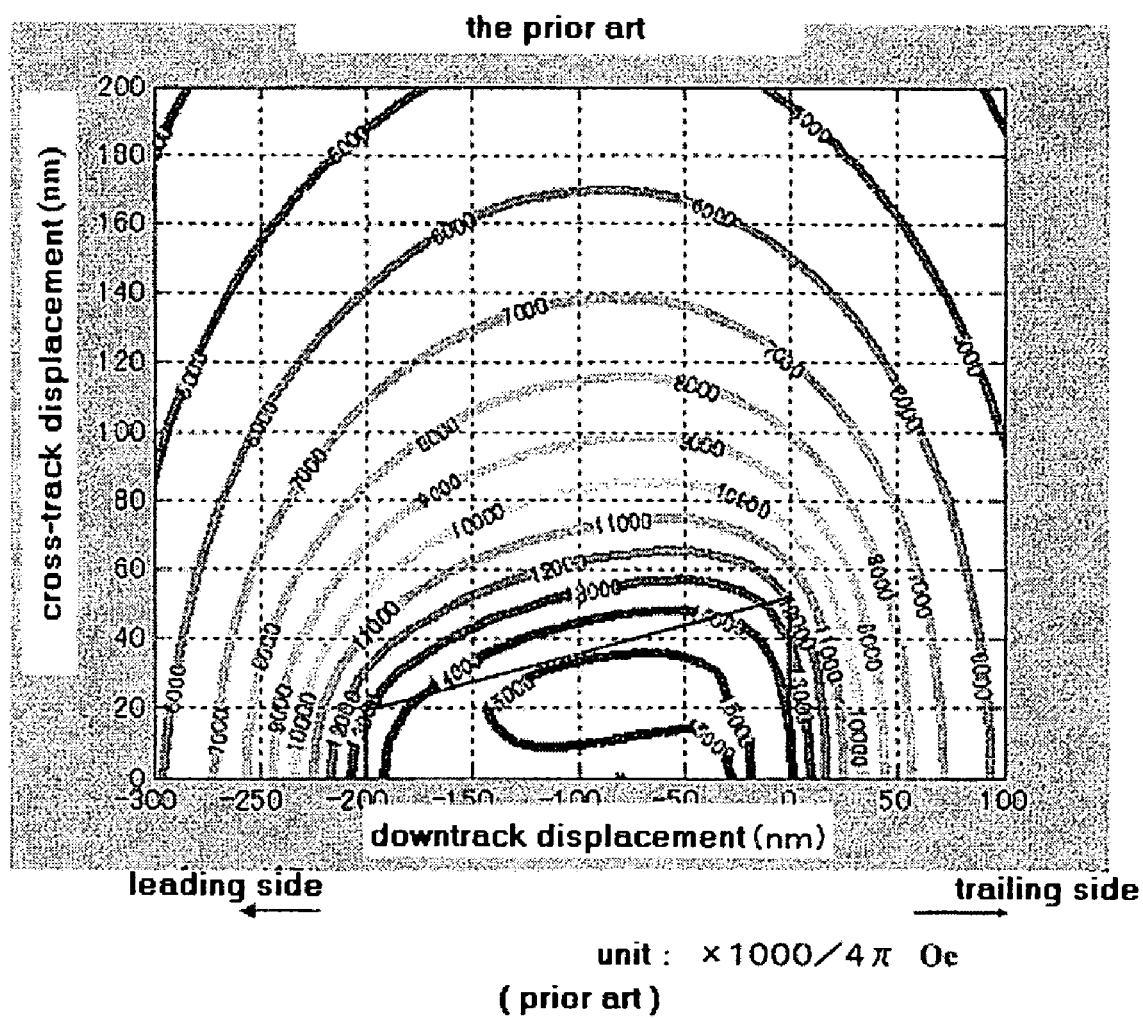
FIG. 8 is a drawing illustrating contour lines of the write-field of a conventional magnetic head.

FIG. 8 is a write-field distribution at the center position of a recording layer of a conventional magnetic head. The contour line of the write-field distribution is along the shape of the air bearing surface of the main pole. The vertical axis is the cross-track displacement and the horizontal axis is the downtrack displacement. The origin of the vertical axis is the track center position. The right side of the horizontal axis is the trailing side. The solid line in the figure denotes the position opposites to the main pole. The position where the broadening of the write-field distribution in the track-width direction is large is located toward the leading side several tens of nanometers from the trailing edge position of the main pole magnetic material.

Figure 9:
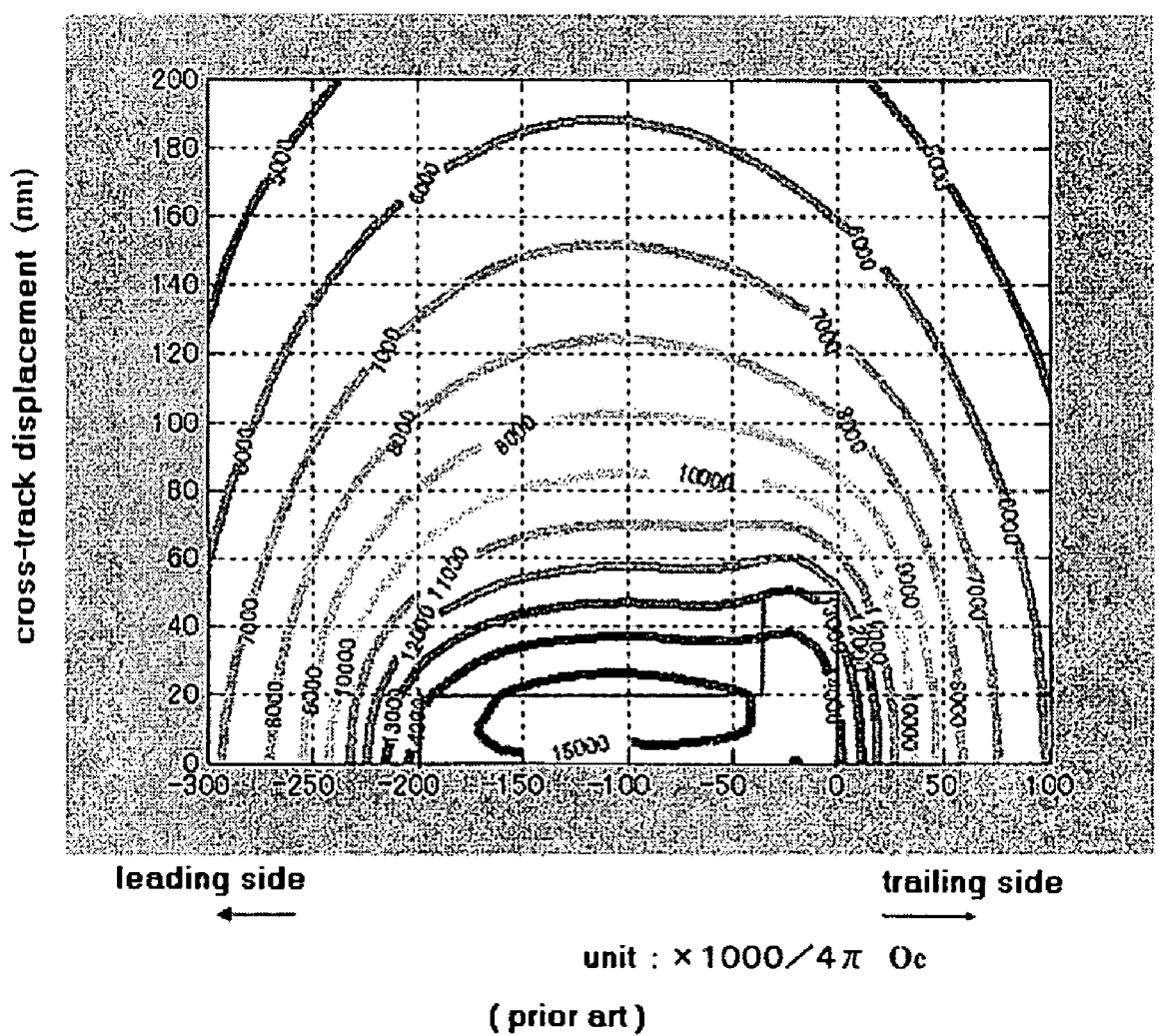
FIG. 9 is a drawing illustrating contour lines of the write-field of a magnetic head in accordance with an embodiment of the present invention.

FIG. 9 is a write-field distribution in the case of a head structure in accordance with an embodiment of the present invention. In the case of a head structure of the embodiment of the present invention, the tip of the pole tip includes two of magnetic films having different widths and the throat height of the pole tip at the leading side is smaller. However, the contour line of the write-field distribution becomes a shape to which the air bearing surface corresponds, and the broadening thereof in the track-width direction can be decreased. In accordance with embodiments of the present invention, broadening the write effective width is decreased by making the throat height at the trailing side large, and the write-field intensity is compensated by making the throat height at the leading side small.

JP 2003-242608 A discloses a magnetic head having a T-shaped air bearing surface, but there is no description of a throat height. In the case of the same throat height, the write-field intensity decreases and the effect obtained in the present invention cannot be obtained. Moreover, JP 2005-93029 A discloses a head having a different throat height, but the dimensions of the magnetic material in the track-width direction at the trailing side and the leading side are the same, so that the effect obtained in the present invention cannot be obtained because of broadening the write-field distribution in the track-width direction.

Figure 10:
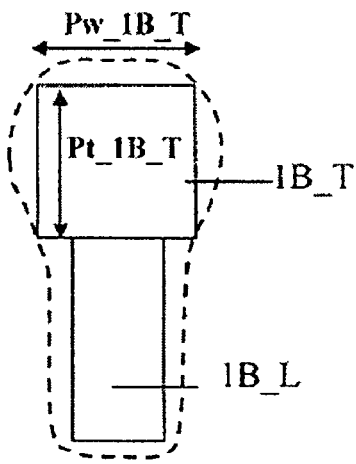
FIG. 10 is a schematic drawing illustrating a pole tip as seen from the air bearing surface.

In a magnetic head according to embodiments of the present invention, it is preferable that the width of the magnetic film in the track-width direction, which includes the pole tip 1B_T at the trailing side, be greater than the film thickness in the downtrack direction when it is seen from the air bearing surface. As shown in FIG. 10, in the case when the width thereof in the track-width direction (Pw_1B_T) is smaller than the film thickness in the downtrack direction (Pt_1B_T), the write-field distribution becomes very large in the track-width direction at the position of the magnetic material at the trailing side, resulting in the effect being very small because of a shape in portrait orientation against the downtrack direction.

Figure 11:
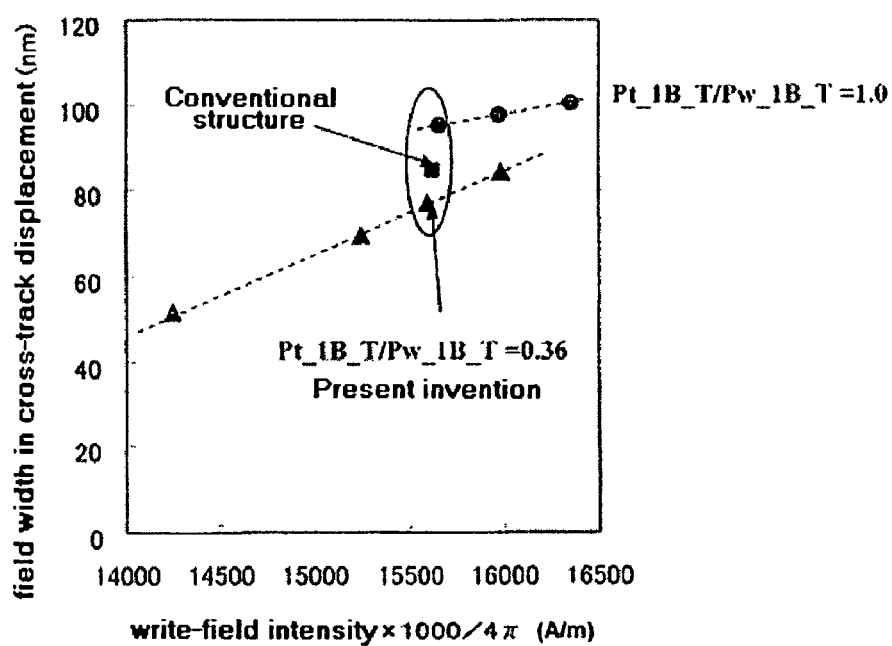
FIG. 11 is a relationship between the write-field intensity and the write-field distribution width using the air bearing surface shape of the pole tip at the trailing side as a parameter.

FIG. 11 shows a relationship between the maximum write-field intensity and the write-field distribution width in the case of Pt_1B_L/Pw_1B_L=0.36 and 1.0. On the assumption that the write-field distribution width is written on the medium, it was calculated at the position of $12000 \times 1000/(4\pi)$ A/m. At this time the calculations were carried out with Pw_1B_L=70 nm and Pt_1B_L=25 nm. Moreover, the thickness of the under layer is assumed to be 100 nm and the distance between the head and the under layer 40 nm, and the write-field was calculated at the position of 21 nm from the head. As shown in the circle in the figure, in the case of Pt_1B_L/Pw_1B_L=0.36, it is understood that the write-field width becomes smaller than the conventional structure even if the maximum write-field intensity is the same. In the case of Pt_1B_L/Pw_1B_L=1.0, there is a condition where the effect cannot be obtained as shown in the figure.

Moreover, in accordance with embodiments of the present invention, the difference of the magnetic film in the track-width direction between the magnetic film 1B_T of the pole tip at the trailing side and the magnetic film 1B_L at the leading side is important. In accordance with embodiments of the present invention, it is preferable that the difference of the widths in the track-width direction between the magnetic film constituting the pole tip 1B_T at the trailing side and the magnetic film constituting the pole tip 1B_L at the leading side be greater than the film thickness of the magnetic film constituting the pole tip 1B_T at the trailing side. If the difference is small, the distribution in the width direction does not become small. According to such a structure, the write-field distribution width at the leading side can be further decreased.

Figure 12:
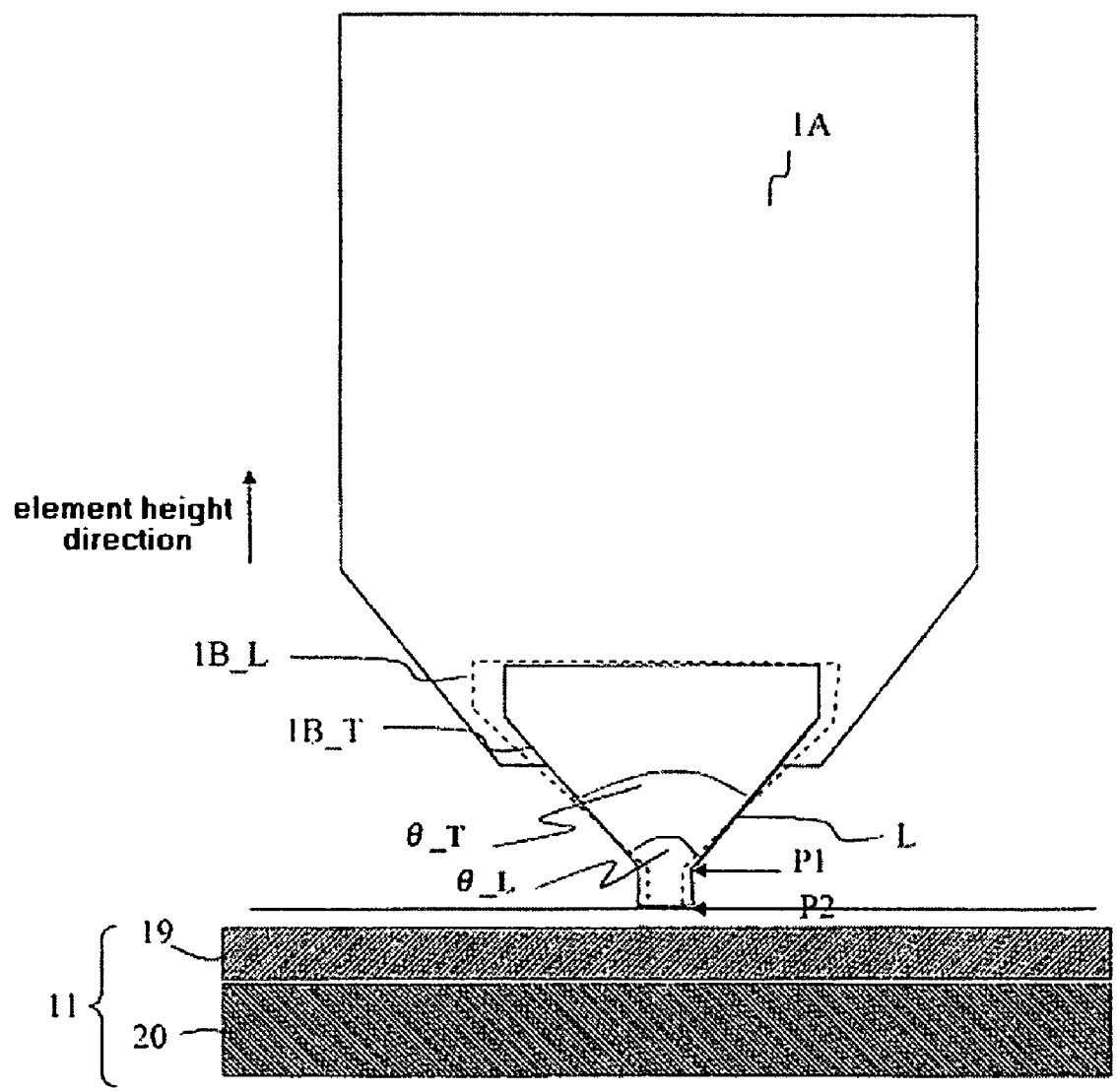
FIG. 12 is a plane schematic drawing illustrating another example of a magnetic head in accordance with an embodiment of the present invention as seen from the trailing direction.

FIG. 12 is a plane schematic drawing illustrating another structural example of a main pole of a magnetic head of an embodiment of the present invention seen from the trailing side. The pole tip 1B of the main pole of the magnetic head consists of at least two magnetic films having different widths in the track-width direction at the air bearing surface and has a structure in which the width in the track-width direction of the pole tip 1B_T at the trailing side is greater than that of the pole tip 1B_L at the leading side at the air bearing surface; the throat height of the pole tip 1B_T at the trailing side is greater than that of the pole tip 1B_L at the leading side; and the flare angle $\theta\_T$ of the magnetic film constituting the pole tip 1B_T at the trailing side is smaller than the flare angle $\theta\_L$ of the squeeze point of the magnetic film constituting the pole tip 1B_L at the leading side. Even if such a main pole structure is taken, a smaller flare angle results in a smaller write-field intensity and a narrower write-field distribution width in the track-width direction, resulting in the effect shown in FIG. 7 being obtained. The write-field intensity takes the maximum value when the flare angle θ_T of the magnetic film 1B_T at the trailing side is from 100 degrees to 110 degrees. Then, it is preferable that the flare angle θ_L of the squeeze point of the magnetic film at the leading side be made greater than that.

Figure 13:
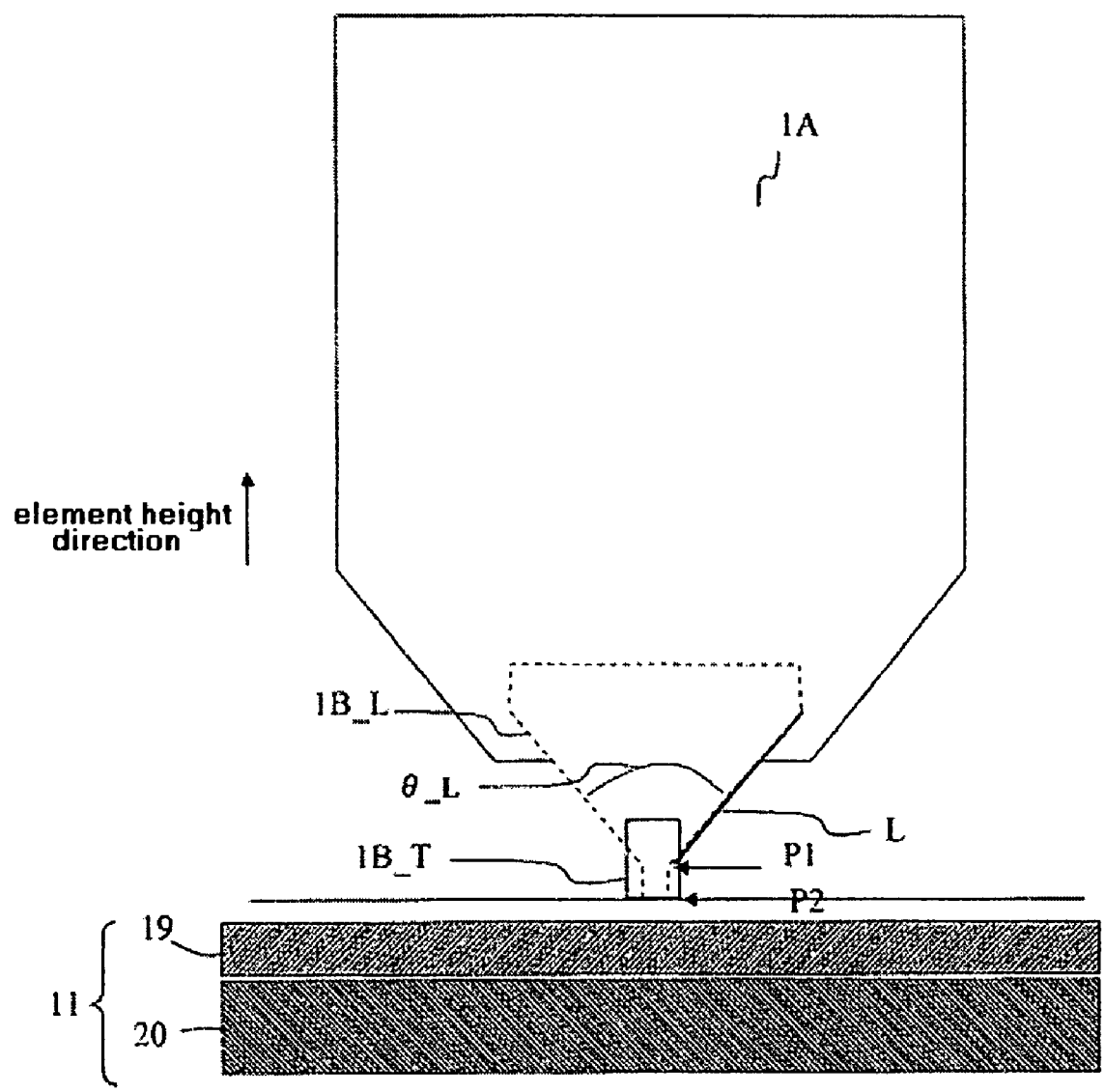
FIG. 13 is a plane schematic drawing illustrating another example of a magnetic head in accordance with an embodiment of the present invention as seen from the trailing direction.

Moreover, as shown in FIG. 13, the magnetic film 1B_T may not have the squeeze point at the trailing side. Since there is no squeeze point, even if variations are created in the head manufacturing process, the variations in the track width can be decreased. Moreover, in accordance with embodiments of the present invention, it is preferable that the saturation magnetic flux density of the magnetic film at the trailing side be greater than the saturation magnetic flux density of the magnetic film at the leading side. As a result, magnetic flux is concentrated to the trailing side, the effect of controlling the write-field distribution in the track-width direction is achieved even more.

Moreover, as shown in FIG. 14, the shape of the air bearing surface of the magnetic film at the trailing side and/or the magnetic film at the leading side may be made a reverse-trapezoid. (a) is one where the shape of the magnetic film at the trailing side is made a reverse-trapezoid and (b) is one where the shape of the magnetic film at the leading side is made a reverse-trapezoid. (c) is one where both magnetic films at the trailing side and the leading side are reverse-trapezoids. Since the head write-field distribution reflects the shape of the air bearing surface of the head magnetic material, the distribution in the width direction can be decreased by taking a shape like FIG. 14.

Figure 15:
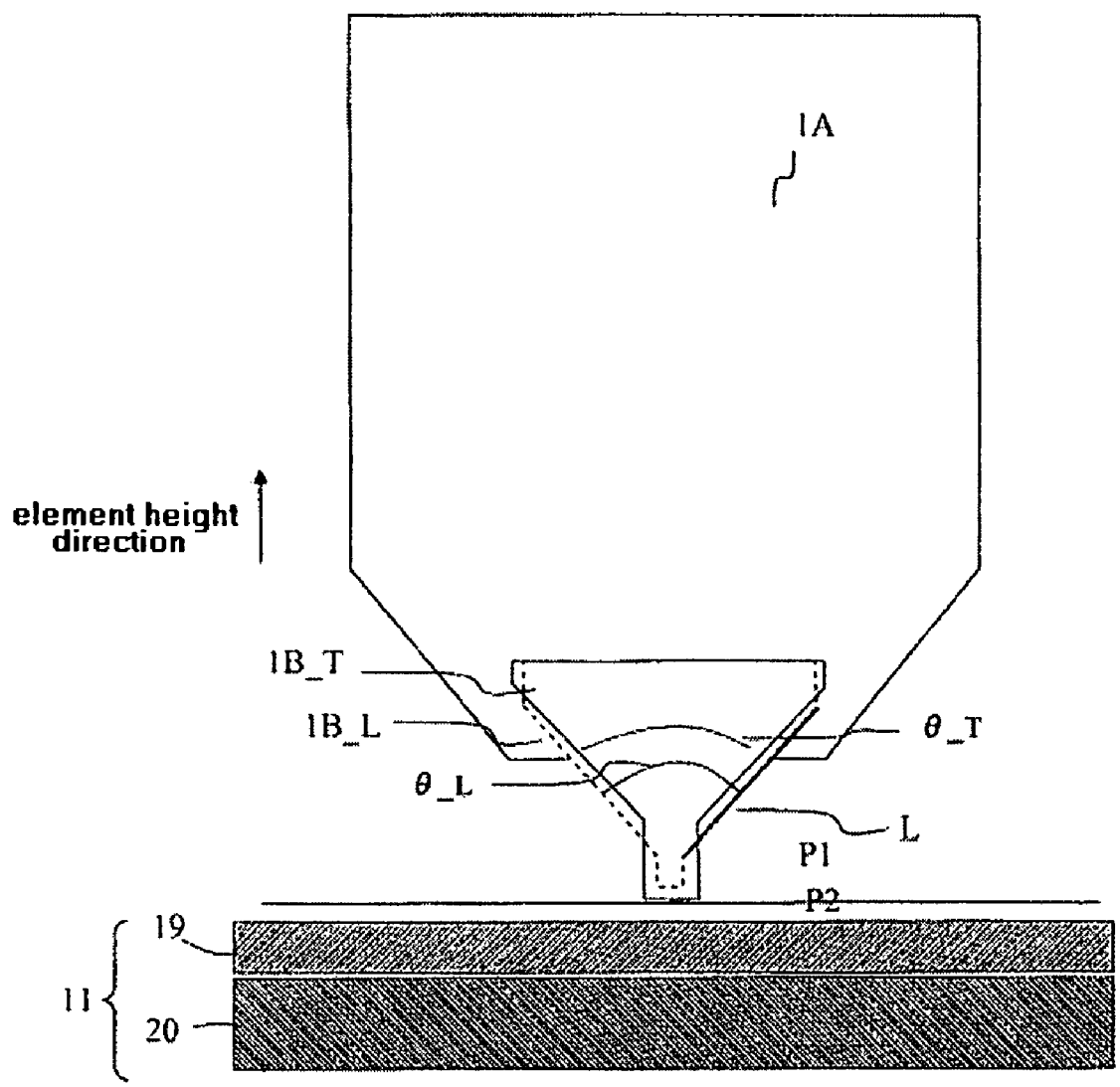
FIG. 15 is a plane schematic drawing illustrating another example of a magnetic head in accordance with an embodiment of the present invention as seen from the trailing direction.

Moreover, even if the magnetic film at the leading side is recessed from the air bearing surface as shown in FIG. 15, the distribution in the width direction can be decreased even more.

An embodiment of a manufacturing method suitable for formation of a T-shaped main pole of the present invention will be explained referring to the drawings. A feature of the manufacturing method is that a magnetic pole dividing into two, a lower layer (leading side) and an upper layer (trailing side), is formed and a T-shaped main pole is formed. Next, a manufacturing process is explained by using the process flow.

Figure 16A:
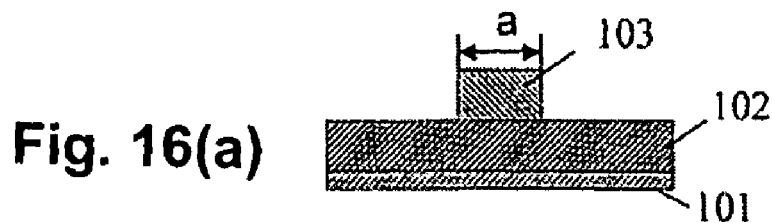
FIG. 16 are drawings illustrating an example of a manufacturing method of a magnetic head in accordance with an embodiment of the present invention.
Figure 16B:
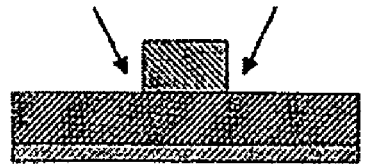
Figure 16C:
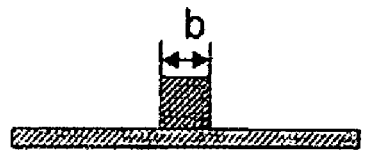
Figure 16D:
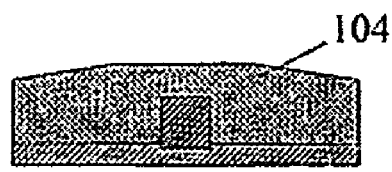
Figure 16E:
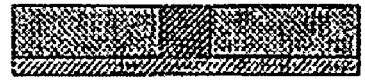

FIG. 16(a) is a drawing in which an under layer magnetic pole material 102 of the lower layer is formed on the Al$_2$O$_3$ 101 and a photo-resist mask 103 having a pattern width "a" of 200 nm is formed thereon. An FeCo/Cr multi-layer film and a single-layer film fabricated by a sputtering technique which exceeded 2 T were used for the magnetic pole material. A plating film may be used for the main pole material. Moreover, the film thickness of the main pole material was set to be 300 nm. Since definition and superposition accuracy are required in this method, an ArF scanner was used for formation of the photo-resist mask. In addition to an ArF scanner a KrF scanner or a stepper may also be used. Next, using the resist as a mask, the magnetic pole material is processed vertically as shown in FIG. 16(b) by using ion milling. In order to process vertically, the ion milling conditions were set to be −30°×13 minutes and −75°×5 minutes. The former is performed for the purpose of the perpendicular element and the latter is for the purpose of removing the re-deposition. As a result, a main pole width "b" of 80 nm was obtained as shown in FIG. 16(c). The shift by the milling was about 120 nm. Next, the main pole material which is processed to 80 nm in width is covered with a 500 nm of Al$_2$O$_3$ (FIG. 16(d)), and it was polished to 200 nm by using CMP and planarized as shown in FIG. 16(e). Al$_2$O$_3$ system abrasive particles were used for CMP.

Figure 16F:
Figure 16G:
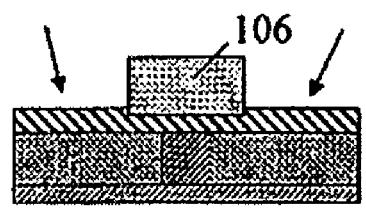
Figure 16H:
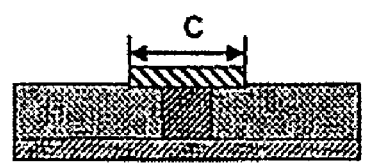

The upper layer magnetic pole material 105 as shown in FIG. 16(f) was formed on the planarized magnetic pole and on the Al$_2$O$_3$ (FIG. 16(f)). An FeCo/Cr multi-layer film and a single-layer film fabricated by a sputtering technique which exceeded 2 T were used for the magnetic pole material. A plating film may also be used for the main pole material 105. A pattern width resist pattern 106 was formed on this magnetic pole material 105 as shown in FIG. 16(g). An ArF scanner was used for the formation of this photo-resist pattern, the same as the aforementioned photoresist mask 103. Using this photoresist and forming a magnetic pole material by using ion milling, a T-shaped main pole could be formed as shown in FIG. 16(h). In this process, as shown in FIG. 17, a head of the present invention could be obtained in which the width of the mask pattern 107 of the upper layer is wider than that of the lower layer 108, and the flare point "d" of the upper layer mask is arranged away from the side to be an air bearing surface after completing the head element compared with the flare point "e" of the lower layer mask.

Moreover, another manufacturing process is shown in FIG. 18. FIG. 18(a) is a drawing where a CMP stopper 109 is inserted between the Al$_2$O$_3$ in a process for covering the Al$_2$O$_3$ shown in FIG. 16(d). Therefore, highly accurate film thickness control becomes possible due to the CMP stopper after polishing as shown in FIG. 18(b). The following are the same as the processes after FIG. 16(f).

What is claimed is:

1. A magnetic head for a perpendicular recording comprising a main pole and an auxiliary pole, wherein
    said main pole has a pole tip providing a write track-width and a yoke part recessed from said pole tip in the element-height direction; and
    said pole tip has two magnetic films having different widths in the track-width direction; the width in the track-width direction at an air bearing surface of the magnetic film at the trailing side is greater than the width in the track-width direction at an air bearing surface of the magnetic film at the leading side; and a throat height of the magnetic film at said trailing side is greater than a throat height of the magnetic film at said leading side.

2. A magnetic head according to claim 1, wherein
    the width in the track-width direction at the air bearing surface of the magnetic film at said trailing side is greater than the film thickness at said trailing side in the down-track direction.

3. A magnetic head according to claim 1, wherein
    the difference of the widths of the part where the magnetic film at said trailing side and the magnetic film of said leading side are connected to each other at the air bearing surface is greater than the film thickness in the down-track direction of the magnetic film at said trailing direction.

4. A magnetic head according to claim 1, wherein
    the shape of the air bearing surface of the magnetic film at said trailing side and/or the magnetic film at said leading side is a reverse-trapezoid.

5. A magnetic head according to claim 1, wherein
    the magnetic film at said leading side is recessed from the air bearing surface.

6. A magnetic head according to claim 1, wherein
    a flare angle of a squeeze point of the magnetic film at said trailing side is smaller than a flare angle of a squeeze point of the magnetic film at said leading side.

7. A magnetic head according to claim 1, wherein
    the magnetic film at said leading side is not recessed from the air bearing surface.

8. A magnetic head according to claim 1, further comprising magnetic material arranged on the trailing side of the main pole for increasing a write-flied gradient of the magnetic head in a head downtrack direction.

9. A magnetic head according to claim 1, wherein the two magnetic films that comprise the pole tip comprise different materials from each other at the air bearing surface.

10. A magnetic head according to claim 1, further comprising magnetic material arranged on at each side in a track width direction of the main pole.

11. A magnetic head according to claim 1, wherein the throat height of the magnetic film at said trailing side is at least about twice that of the throat height of the magnetic film at said leading side.

12. A magnetic head according to claim 11, wherein a flare point of the magnetic film at said leading side is closer to the air bearing surface than a flare point of the magnetic film at said trailing side.

13. A magnetic head according to claim 1, wherein the magnetic film at the trailing side has a width in the track width direction of about 100 nm and a thickness in the downtrack direction of about 30 nm, the magnetic film at the leading side has a width in the track width direction of about 40 nm and a thickness in the downtrack direction of about 170 nm.

14. A magnetic head according to claim 1, wherein the magnetic film at the trailing side has a thickness in the downtrack direction of at least about 5 times that of a thickness in the downtrack direction of the magnetic film at the leading side.

15. A magnetic disk storage apparatus comprising:
a recording medium;
a medium driving part driving said recording medium;
a magnetic head which has a write head and a read head and performs write and read to said recording medium; and
a head driving part positioning said magnetic head relative to said recording medium, wherein
said recording medium is a perpendicular recording medium having a soft under layer and a recording layer,
said write head has a main pole and an auxiliary pole,
said main pole has a pole tip providing a write track-width and a yoke part recessed from said pole tip in the element-height direction, and
said pole tip has two magnetic films having different widths in the track-width direction; the width in the track-width direction at an air bearing surface of the magnetic film at the trailing side is greater than the width in the track-width direction at an air bearing surface of the magnetic film at the leading side; and a throat height of the magnetic film at said trailing side is greater than a throat height of the magnetic film at said leading side.

16. A magnetic disk storage apparatus according to claim 15, wherein
a flare angle of a squeeze point of the magnetic film at said trailing side is smaller than a flare angle of a squeeze point of the magnetic film at said leading side.

* * * * *